(12) United States Patent
Hore et al.

(10) Patent No.: US 11,625,535 B1
(45) Date of Patent: Apr. 11, 2023

(54) COMPUTER-BASED SYSTEMS HAVING DATA STRUCTURES CONFIGURED TO EXECUTE SIC4/SIC8 MACHINE LEARNING EMBEDDED CLASSIFICATION OF ENTITIES AND METHODS OF USE THEREOF

(71) Applicant: American Express Travel Related Services Company, Inc., New York, NY (US)

(72) Inventors: Prodip Hore, Gurgaon (HR); Mrigank Prince, Patna (BR); Jayatu Sen Chaudhury, Gurgaon (HR); Prakhar Thapak, Gwalior (MA); Soham Banerjee, Gurugram (HR); Shailja Pandey, Delhi (IN); Chanderpreet Singh Duggal, London (GB)

(73) Assignee: American Express Travel Related Services Company, Inc., New York, NY (US)

( * ) Notice: Subject to any disclaimer, the term of this patent is extended or adjusted under 35 U.S.C. 154(b) by 379 days.

(21) Appl. No.: 16/704,424

(22) Filed: Dec. 5, 2019

(51) Int. Cl.
  *G06F 40/295* (2020.01)
  *G06K 9/62* (2022.01)
  *G06N 3/04* (2023.01)

(52) U.S. Cl.
  CPC ......... *G06F 40/295* (2020.01); *G06K 9/6267* (2013.01); *G06N 3/0454* (2013.01)

(58) Field of Classification Search
  CPC ...... G06F 16/3347; G06F 16/35; G06F 40/03; G06F 40/205; G06F 40/295; G06F 40/30;
  (Continued)

(56) References Cited

U.S. PATENT DOCUMENTS 5,873,111 A * 2/1999 Edberg ................. G06F 40/268
                                                  704/8
6,324,531 B1 * 11/2001 Anderson ............ G06N 3/0454
                                                  356/73
(Continued)

OTHER PUBLICATIONS

"Beautiful Soup Document," 4.9.0 Pytho library, available at https://www.crummy.com/software/BeautifulSoup/bs4/doc/.
(Continued)

*Primary Examiner* — Gerald Gauthier
(74) *Attorney, Agent, or Firm* — Sterne, Kessler, Goldstein & Fox P.L.L.C.

(57) ABSTRACT

At least some embodiments are directed to an entity classification system receives informational data associated with an entity. The informational data includes sentences associated with the entity. The entity classification system utilizes a first machine learning model to determine a first contextual meaning among words of a sentence associated with the entity based on a first word embedding technique, and determines at least one category associated with the entity based at least in part on the first contextual meaning. The entity classification system utilizes a second machine learning model to determine a second contextual meaning shared by a set of sentences based on a second embedding technique, and determines a subcategory of the category associated with the entity based at least in part on the second contextual meaning. The entity classification system generates an output including the category and subcategory associated with the entity.

18 Claims, 10 Drawing Sheets

(58) Field of Classification Search
CPC .... G06F 16/634; G06F 16/683; G06F 16/951; G06F 16/953; G06F 21/64; G06K 9/6256; G06K 9/6267; G06K 9/629; G06N 3/0445; G06N 3/0454; G06N 3/049; G06N 3/08; G06N 3/084; G06N 20/00; G06Q 30/016; G06Q 30/0601; G06Q 10/00; G06Q 10/10; G06Q 30/04; G06V 30/414; H04L 51/02; G10L 15/00
USPC .............................................................. 704/9
See application file for complete search history.

(56) References Cited

U.S. PATENT DOCUMENTS

| | | | | |
|---|---|---|---|---|
| 6,505,181 | B1* | 1/2003 | Lambert | G06K 9/62 706/20 |
| 8,078,551 | B2* | 12/2011 | Bar | G06F 40/53 706/12 |
| 8,577,671 | B1* | 11/2013 | Barve | G06F 40/30 715/752 |
| 9,348,809 | B1* | 5/2016 | Zhao | G06F 40/284 |
| 9,672,205 | B2* | 6/2017 | Miller | G06F 40/295 |
| 10,776,670 | B2* | 9/2020 | Wierstra | G06N 3/0454 |
| 10,788,900 | B1* | 9/2020 | Brendel | G06F 3/0482 |
| 10,891,539 | B1* | 1/2021 | Kearney | G06K 9/629 |
| 11,003,830 | B2* | 5/2021 | Soni | G06V 30/414 |
| 11,042,709 | B1* | 6/2021 | Pham | G06F 40/205 |
| 11,209,813 | B2* | 12/2021 | Cella | G06V 10/70 |
| 2003/0037036 | A1* | 2/2003 | Weare | G06F 16/683 |
| 2003/0045953 | A1* | 3/2003 | Weare | G10L 15/00 704/E15.001 |
| 2003/0045954 | A1* | 3/2003 | Weare | G06F 16/634 707/E17.009 |
| 2003/0191626 | A1* | 10/2003 | Al-Onaizan | G06F 40/295 704/8 |
| 2004/0122661 | A1* | 6/2004 | Hawkinson | G06F 40/30 704/10 |
| 2008/0033775 | A1* | 2/2008 | Dawson | G06Q 10/00 705/7.28 |
| 2008/0205280 | A1* | 8/2008 | Saphir | G06N 3/049 370/236 |
| 2011/0072052 | A1* | 3/2011 | Skarin | G06Q 10/10 707/E17.098 |
| 2015/0199333 | A1* | 7/2015 | Nekhay | G06F 40/268 704/9 |
| 2018/0018588 | A1* | 1/2018 | Dalton | G06Q 30/04 |
| 2018/0121799 | A1* | 5/2018 | Hashimoto | G06N 3/084 |
| 2018/0173495 | A1* | 6/2018 | Podder | G06F 7/023 |
| 2018/0293302 | A1* | 10/2018 | Ko | G06F 16/35 |
| 2018/0365229 | A1* | 12/2018 | Buhrmann | G06N 3/0454 |
| 2019/0057310 | A1* | 2/2019 | Olmstead | G06F 40/284 |
| 2019/0138860 | A1* | 5/2019 | Liu | G06N 3/0472 |
| 2019/0151758 | A1* | 5/2019 | Anglin | G06F 16/953 |
| 2019/0236613 | A1* | 8/2019 | Dinh | G06F 16/3347 |
| 2019/0332666 | A1* | 10/2019 | Dadachev | G06F 40/30 |
| 2019/0377825 | A1* | 12/2019 | Chang | G06F 40/247 |
| 2020/0050667 | A1* | 2/2020 | Lin | G06F 16/35 |
| 2020/0057807 | A1* | 2/2020 | Kapur | G06N 3/0445 |
| 2020/0090641 | A1* | 3/2020 | Kim | H04L 51/02 |
| 2020/0159832 | A1* | 5/2020 | Cai | G06F 40/30 |
| 2020/0242465 | A1* | 7/2020 | Krishnan | G06Q 30/0601 |
| 2020/0302118 | A1* | 9/2020 | Cheng | G06F 40/295 |
| 2020/0349464 | A1* | 11/2020 | Lin | G06N 3/084 |
| 2020/0387570 | A1* | 12/2020 | Biswas | G06F 40/30 |
| 2020/0401661 | A1* | 12/2020 | Kota | G06N 20/00 |
| 2021/0004670 | A1* | 1/2021 | Tripathi | G06K 9/6256 |
| 2021/0034784 | A1* | 2/2021 | Baughman | G06N 3/0454 |
| 2021/0042515 | A1* | 2/2021 | Anderson | G06N 20/00 |
| 2021/0049466 | A1* | 2/2021 | Milman | G06Q 30/016 |
| 2021/0065041 | A1* | 3/2021 | Gopalan | G06V 30/414 |
| 2021/0073252 | A1* | 3/2021 | Guo | G06N 3/049 |
| 2021/0089724 | A1* | 3/2021 | Luong | G06N 3/08 |
| 2021/0233618 | A1* | 7/2021 | Thompson-Colón | G06N 20/00 |
| 2022/0163959 | A1* | 5/2022 | Cella | G05B 17/02 |

OTHER PUBLICATIONS

Pennington, et al., "GloVe: Global Vectors for Word Representation," Proceedings of the 2014 Conference on Empirical Methods in Natural Language Processing, Association for Computational Linguistics (Oct. 2014); available at https://nlp.stanford.edu/pubs/glove.pdf.

"Universal-sentence-encoder," TensorFlowHub; available at https://tfhub.dev/google/universal-sentence-encoder/1.

Chris Nicholson, A Beginner's Guide to Important Topics in AI, Machine Learning, and Deep Learning. A.I. Wiki (2020); available at https://wiki.pathmind.com/attention-mechanism-memory-network.

"Cosine similarity," Wikipedia; available at https://en.wikipedia.org/wiki/Cosine_similarity.

Mikolov, et al., "Distributed Representations of Words and Phrases and their Compositionality," Advances in neural information processing systems (2013); available at https://papers.nips.cc/paper/5021-distributed-representations-of-words-and-phrases-and-their-compositionality.pdf.

Christopher Olah, "Understanding LSTM Networks," Colah's blog (Aug. 27, 2015); available at https://colah.github.io/posts/2015-08-Understanding-LSTMs/.

Manning et al., "Introduction to Information Retrieval," Cambridge University Press (2008); companion website available at https://nlp.stanford.edu/IR-book/.

Vaswani, et al., "Attention Is All You Need," 31st Conference on Neural Information Processing Systems (2017), Long Beach, CA; available at https://papers.nips.cc/paper/7181-attention-is-all-you-need.pdf.

* cited by examiner

COMPUTER-BASED SYSTEMS HAVING DATA STRUCTURES CONFIGURED TO EXECUTE SIC4/SIC8 MACHINE LEARNING EMBEDDED CLASSIFICATION OF ENTITIES AND METHODS OF USE THEREOF

BACKGROUND OF TECHNOLOGY

Some computing devices may store large records of data associated with one or more entities. Classifying such entities into categories can sometimes be an inaccurate, resource intensive, and complex problem.

SUMMARY OF DESCRIBED SUBJECT MATTER

In some embodiments, the present disclosure provides a technically improved computer-based system/method/apparatus that includes at least the following components/steps of an entity classification system that receives informational data associated with an entity. The informational data can include sentences associated with the entity. The entity classification system can utilize a first machine learning model to determine a first contextual meaning among words of a sentence associated with the entity based on a first word embedding technique, and determines at least one category associated with the entity based at least in part on the first contextual meaning. The entity classification system can utilize a second machine learning model to determine a second contextual meaning shared by a set of sentences based on a second embedding technique, and determines a subcategory of the category associated with the entity based at least in part on the second contextual meaning. The entity classification system generates an output including the category and subcategory associated with the entity.

In some embodiments, the first machine learning model can produce a set of category profiles represented by word embeddings, and a category associated with an entity is determined at least in part on a category profile represented by word embeddings from the set of category profiles represented by word embeddings.

In some embodiments, the second machine learning model can produce a set of subcategory profiles represented by word embeddings, and the subcategory associated with the entity is determined at least in part on a subcategory profile represented by word embeddings from the set of subcategory profiles represented by word embeddings.

In some embodiments, the entity classification system determines a category associated with an entity and the subcategory associated with the entity at least in part utilizing a cosine similarity technique between information data associated with the entity and, a set of category profiles represented by word embeddings or a set of subcategory profiles represented by word embeddings. For computing cosine similarity, the words appearing for the entity is being replaced by corresponding word embeddings obtained for the category it being matched.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

FIGS. 1 through 10 illustrate systems and methods for machine learning entities classification. The following embodiments provide technical solutions and/or technical improvements that overcome technical problems, drawbacks and/or deficiencies in the technical field of machine learning classification. As explained in more detail, below, technical solutions and/or technical improvements herein include aspects of improved and accurate machine learning predictions for the classification of categories and subcategories of an entity or entities. Moreover, various practical applications of the disclosed technology are also described, which provide further practical benefits to users and operators that are also new and useful improvements in the art.

Figure 1:
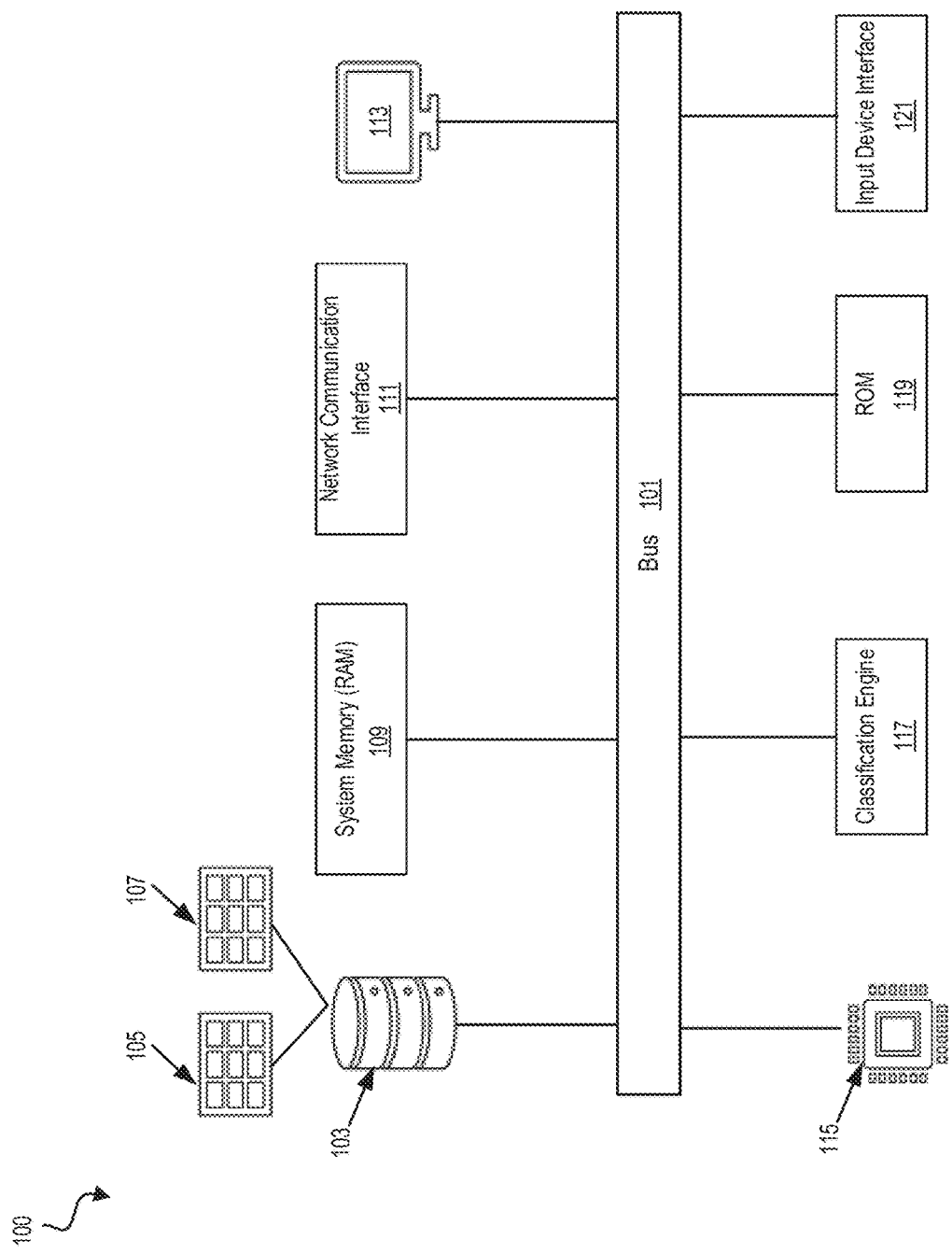
FIGS. 1-10 show one or more schematic flow diagrams, certain computer-based architectures, and/or screenshots of various specialized graphical user interfaces which are illustrative of some aspects of at least some embodiments of the present disclosure.

FIG. 1 illustrates an example of an implementation of an entity classification system, in accordance with one or more embodiments of the present disclosure. In some embodiments, an entity classification system 100 can include a communication bus 101, a processor 115, a system memory (RAM) 109, a read-only memory (ROM) 119, a database or storage device 103, an input device interface 121, an output device interface such as display 113, and a network communication interface 111.

In some embodiments, the communication bus 101 collectively represents system, peripheral, and/or chipset buses that communicatively connect the numerous internal devices of the entity classification system 100. The communication bus 101 may be a physical interface for interconnecting the various components, however in some embodiments, the communication bus 101 may be a network interface, router, switch, or other communication interface.

In some embodiments, the entity classification system 100 may receive and/or store multiple datasets or records, for example, datasets or records 105 and 107. Datasets or records 105 and 107 can include data values representing unclassified entities, sets of categories, and sets of subcategories associated with one or more users, or non-person entities such as commercial entities, including merchants, industrial entities, firms and businesses, governmental organizations or other suitable non-person entities. Some examples the sets of categories and the set of subcategories can be associated with, for example, standard industry classification codes, or other suitable classification system or classification scheme. The various components of the entity classification system 100 may interoperate to detect, predict, and/or infer complex patterns associated with, for example, a user or non-person entity through the classification engine 117 discussed below with respect to FIG. 2.

In some embodiments, the entity classification system 100 may include a processor 115 configured to perform instructions provided via the bus 101 by, e.g., accessing data stored in memories 109 and 119 via the communication bus 101. In some embodiments, the Read-Only-Memory (ROM) 119 may include a non-volatile storage device, such as, e.g., a magnetic disk hard drive, a solid-state drive, flash memory, or other non-volatile memory and combinations thereof. In some embodiments, system memory 109 may include a volatile memory such as, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, among other data related to the operation of the entity classification system 100.

In some embodiments, a database or storage device 103 stores datasets or records 105 and 107 including data values associated with entities, sets of categories, sets of subcategories or other suitable data. The datasets or records 105 and 107 can include variables associated description of entities, for example, complex operations involving merchants, facilities, supplies, users or group of users associated with a non-person entity. The database or storage device 103 can be updated in real-time or near real-time when, for example, a modifying or updating event occurs related to a user, groups of users or non-person entity. In some implementations the database or storage device 103 can be part of a financial institution system, merchant system, online store system, or other suitable entity capable of registering activities associated with a user, group of users, or non-person entity once the activities are performed by a user or non-person entity, or an event affecting a user or non-person entity occurs. One or more components of the system 100 can communicate with database or storage device 103 via, e.g., the communication bus 101 to retrieve datasets or records 105 and 107 in real-time or near real-time. Accordingly, the entity classification system 100 can classify users, group of users, or non-person entities into categories and subcategories, in real-time or near real-time after one or more activities have been executed by a user, group of users, or non-person entity. In some instances, classification system 100 classify a user, group or users, or non-person entity demand, for example, in real-time of near real-time in response to a user or system request.

In some embodiments, a user or administrator may interact with the entity classification system 100 via a display 113 and a user input device interface 121. The input device interface 121 may include, e.g., a mouse, a keyboard, a touch panel of the display 113, motion tracking and/or detecting, a microphone, an imaging device such as a digital camera, among other input devices. In some implementations, results and statuses related to the entity classification system 100 and operation thereof may be displayed to the user via the display 113 or sent to another computing device not shown in FIG. 1. Some examples of such results can include classification, categorization, and subcategorization of users, groups of users, and/or non-person entities.

As shown in FIG. 1, communication bus 101 can also couple the entity classification system 100 to a network (e.g., network 1007 shown in FIG. 10) through a network communication interface 111. In this manner, the entity classification system 100 can be part of a network of computers (for example a local area network ("LAN"), a wide area network ("WAN"), or an Intranet, or a network of networks, for example the Internet. Any or all components of the entity classification system 100 can be used in conjunction with the subject technology.

Figure 2:
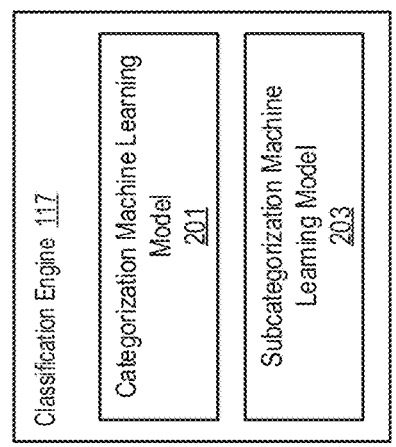

FIG. 2 illustrates internal devices of a classification engine, in accordance with one or more embodiments of the present disclosure. In some embodiments, the classification engine 117 includes one or more machine learning models including a categorization machine learning model 201, and a subcategorization machine learning 203. In some embodiments, subcategories can be represented by a collection of words also referred herein as subcategory prototypes and category prototypes can be generated by combining all words belonging to the subcategories prototypes associated with a category.

In some embodiments, the categorization machine learning model 201 and subcategorization machine learning model 203 produce respectively, category prototypes represented by word embeddings and subcategorization prototypes represented by word embeddings. Word embeddings are a type of word representation that allows words with similar meaning to have a similar representation.

In some embodiments, the categorization machine learning model 201 can generate category prototypes represented by word embeddings. Such category prototypes can be used by the entity classification system 100 to assign a category to a user, group of users, or non-person entity (e.g., a merchant) based on contextual information and/or semantic meaning of words within a sentence. In some implementations, the categorization machine learning model 201 can process information related to a user, a group of users, or non-person entity to compute contextual information and/or semantic meaning utilizing a word embedding technique. Such information can include a set of words that may be meaningful or may not be meaningful (e.g. noise) to determine contextual information and/or semantic meaning associated with the user, groups of users, or non-person entity. In some implementations, the categorization machine learning model 201 can use the meaningful words within a sentence to generate multiple category prototypes represented by word embeddings.

In some embodiments, the subcategorization machine learning model 203 can generate subcategory prototypes represented by word embeddings. Such subcategory prototypes can be used by the entity classification system 100 to assign a subcategory to a user, group of users, or non-person entity (e.g., a merchant) based on contextual information and/or semantic meaning or words included in set of sentences. In some implementations, the subcategorization machine learning model 203 can process information related to a user, a group of users, or non-person entity to compute contextual information and/or semantic meaning utilizing a word embedding technique. Such information can include a set of sentences with words that may be meaningful or may not be meaningful (e.g. noise) to determine contextual information and/or semantic meaning associated with the user, groups of users, or non-person entity. In some implementations, the subcategorization machine learning model 203 can use the meaningful words within a set of sentences to generate multiple category prototypes represented by word embeddings.

In some embodiments, the categorization machine learning model 201 and subcategorization machine learning mode 203 can be implemented with a neural network. Such a neural network can be, for example, a recurrent neural network, a long short-term memory neural network, bidirectional neural network, multi time scale neural network, convolutional neural network, or other suitable type of neural network.

In some embodiments and, optionally, in combination of any embodiment described above or below, an implementation of neural network may be executed as follows:

i) Define neural network architecture/model,
ii) Transfer the input data to the neural network model,
iii) Train the model incrementally,
iv) Determine the accuracy for a specific number of timesteps,
v) Apply the trained model to process the newly-received input data,
vi) Optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a function that combines (e.g., sum, product, etc.) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Figure 3:
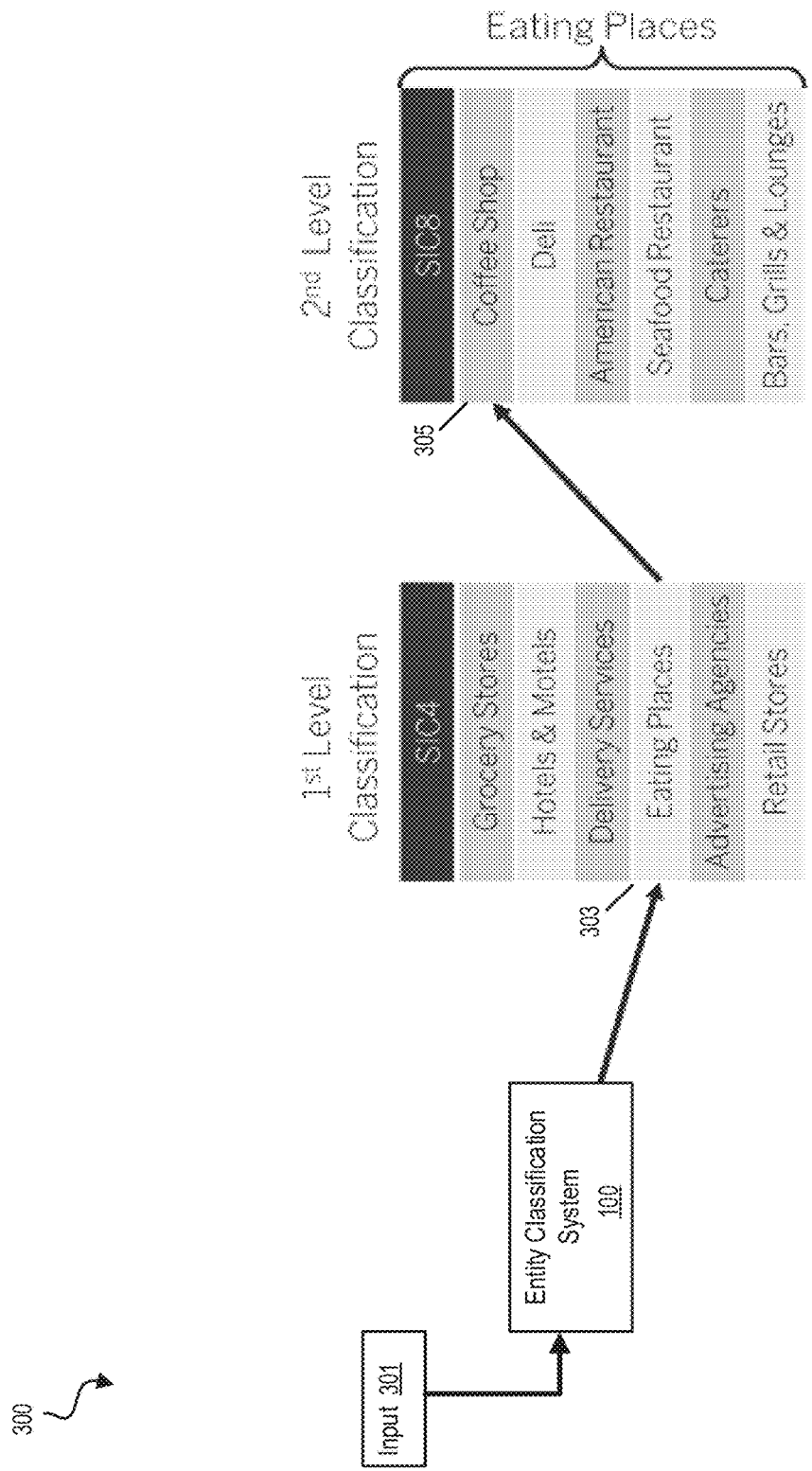

FIG. 3 illustrates a block diagram of an entity classification system, in accordance with one or more embodiments of the present disclosure. In some implementations, the entity classification system 100 receives input 301. As discussed above input 301 can include words within a sentence and/or words within a set of sentences that may be relevant or may not be relevant to the classification of input 301. In some instances, the entity classification system 100 can preprocess or sanitize the information included in input 301 to extract relevant words that can be useful for the classification process. In the example shown in FIG. 3, the entity classification system 100 can assign to the input 301 the category "Eating Places" shown at 303 utilizing category prototypes represented by word embeddings produced by the categorization machine learning 201 (discussed with reference to FIG. 2). Likewise, the entity classification system 100 can assign to the input 301 the subcategory "Coffee Shop" shown at 305 utilizing subcategory prototypes represented by word embeddings produced by the categorization machine learning model 201 and/or the subcategorization machine learning model 203 (discussed with reference to FIG. 2).

Figure 4:
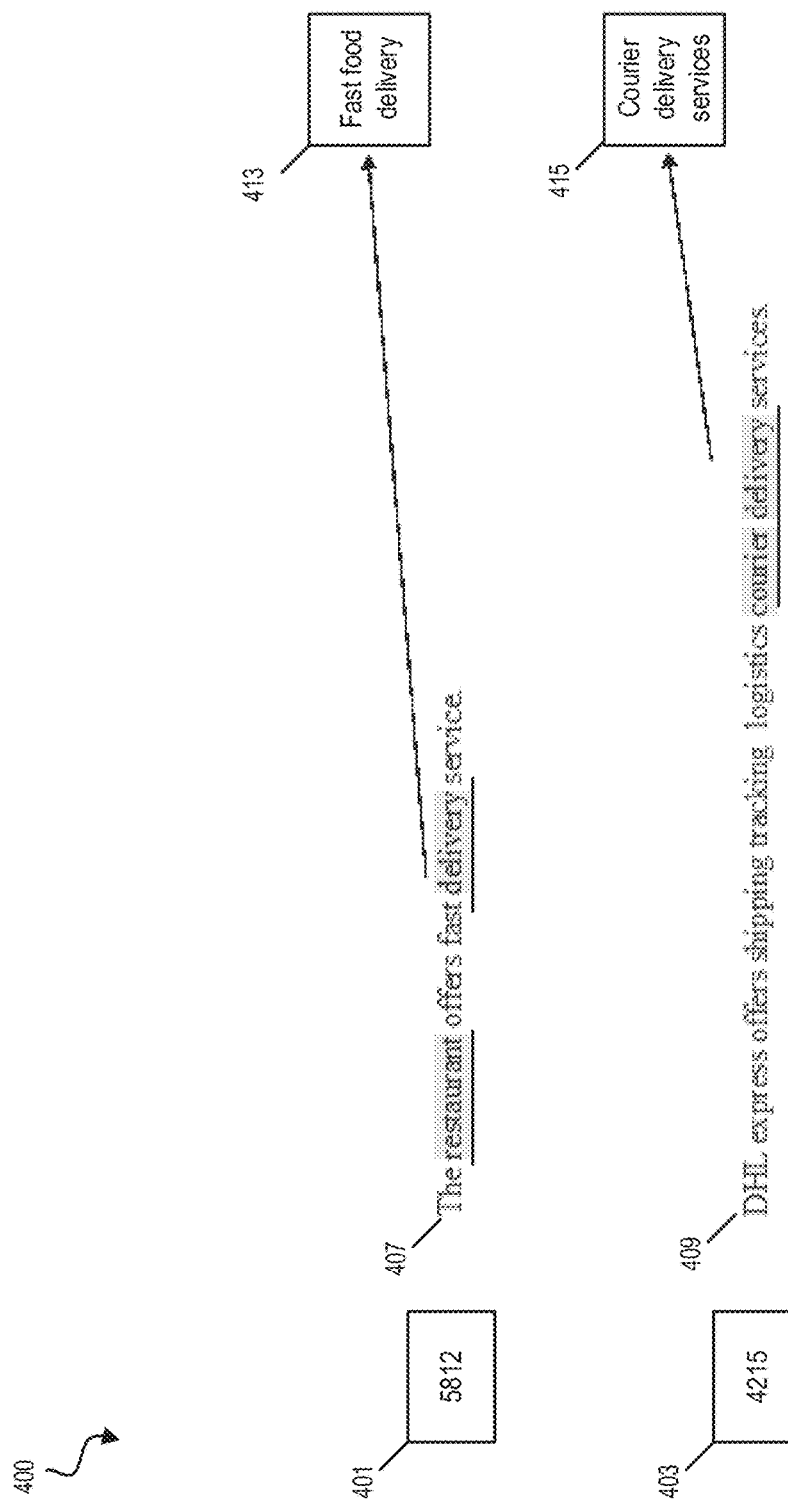

FIG. 4 illustrates a classification based on contextual information and/or semantic meaning at the sentence level, in accordance with one or more embodiments of the present disclosure. In FIG. 4 the word "delivery" can appear in input sentences 407 and input sentence 409. However, the word "delivery" as a different contextual information in each of the sentences 407 and 409. In such a case, the entity classification system 100 can determine utilizing the category prototypes represented by word embeddings (not shown in FIG. 4) that input sentence 407 belongs to the category of "Fast food delivery" as shown at 413. Likewise, the entity classification system 100 can determine utilizing the category prototypes represented by word embeddings (not shown in FIG. 4) that input sentence 409 belongs to the category "Courier delivery services" as shown at 415. In some implementations, the entity classification system 100 can assign to the sentence 407 a standard industry classification code as shown at 401. Likewise, the entity classification system can assign to the sentence 409 a different standard industry classification code as shown at 403. This is a technical advantage because otherwise a user may need to read the entire sentences to make sense what the word "delivery" means in the context of sentence 407 and 409.

Figure 5:
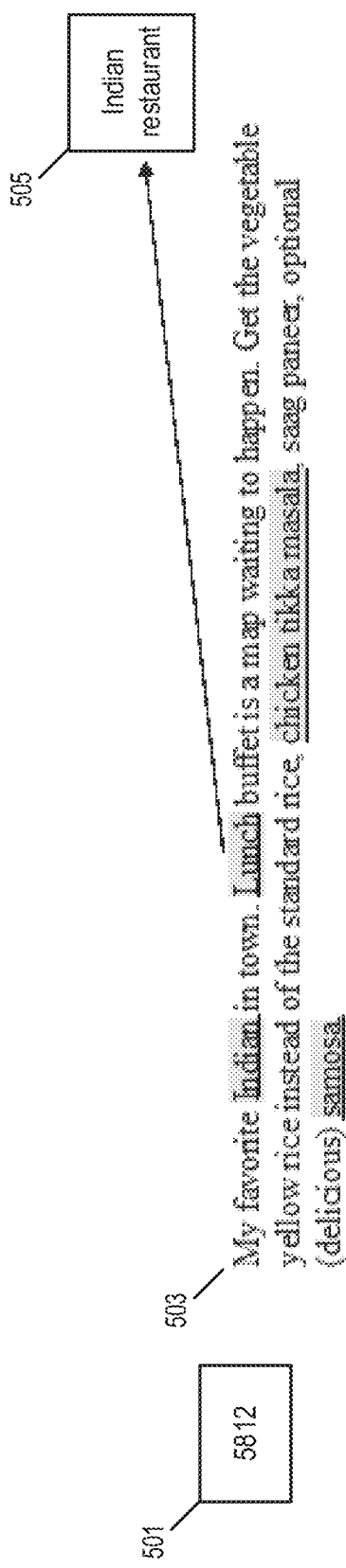

FIG. 5 illustrates an example of a classification based on contextual information and/or semantic meaning of multiple sentences, in accordance with one or more embodiments of the present disclosure. In some instances, the classification system 100 can determine contextual information and/or semantic meaning based on multiple included in a set of sentences identified from multiple sentences, for example, set of sentences 503. The entity classification system 100 can determine utilizing the subcategory prototypes represented by word embeddings (not shown in FIG. 5) that the set of input sentence 503 belongs to the subcategory of "Indian restaurant" 505 and assign such a subcategory to the multiple sentences 503. In some instances, the difference between determining a category at the sentence level as discussed with reference to FIG. 4 and determining a subcategory based on the contextual information and/or semantic meaning across multiple sentences as discussed with reference to FIG. 5 is that a subcategory has a deeper or more specific meaning. For example, the classification system 100 can assign the category of "Eating places" based on a single sentence from the set of sentences 503 and more specifically the subcategory of "Indian restaurant" 505 in real-time or near real-time. As discussed with respect to categories in FIG. 4. The classification system 100 can assign a standard industry classification code 501 to the to the subcategory associated with the set of sentences 503 corresponding to an "Indian restaurant."

Figure 6:
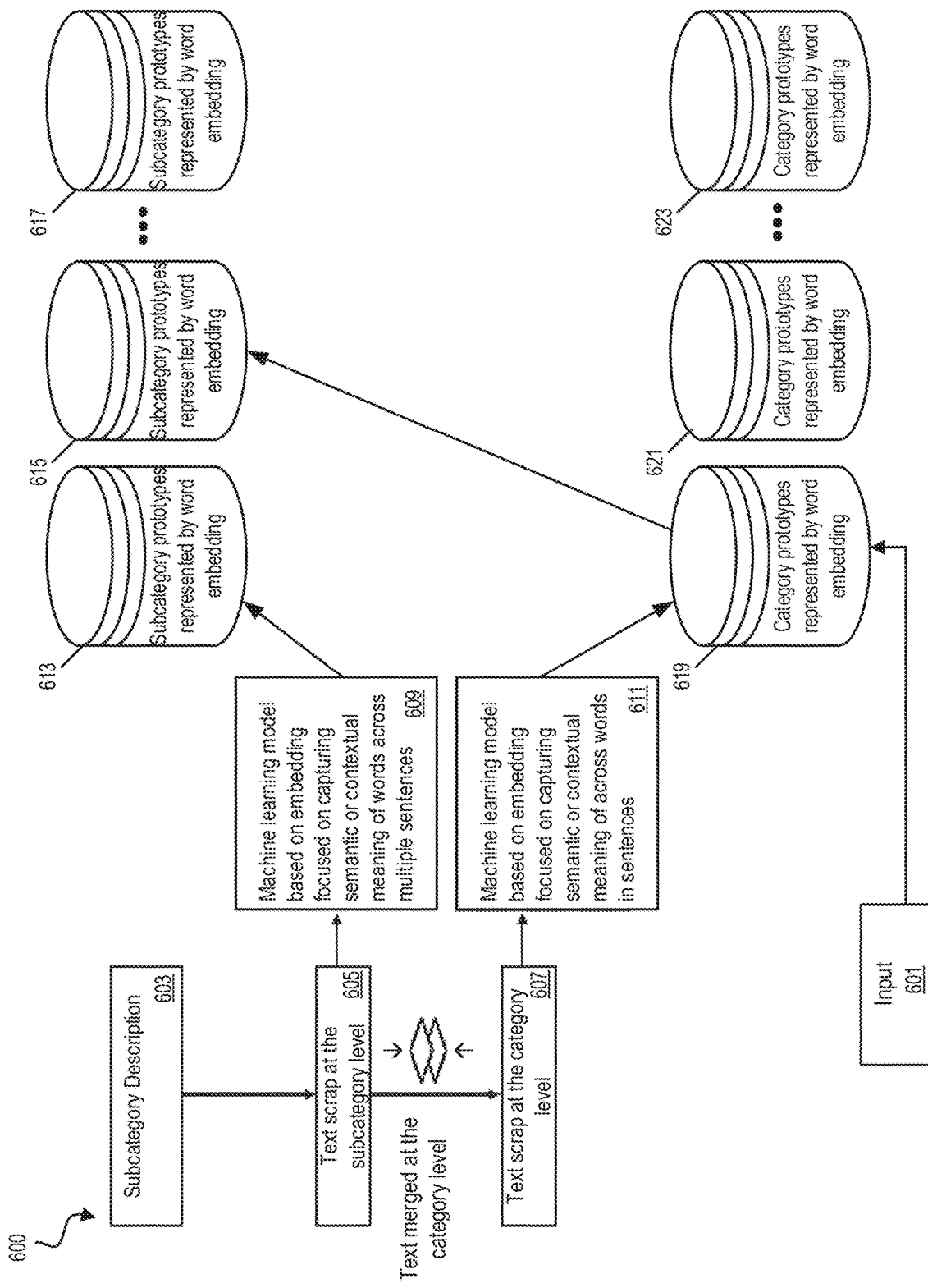

FIG. 6 illustrates an example of a two-stage classification process performed by the classification system, in accordance with one or more embodiments of the present disclosure. In some implementations, the entity classification system 100 can extract or receive sentences or words from a data source, for instance, a search engine or other suitable data source. For instance, for a subcategory the entity classification system 100 can perform a query to retrieve results related to the subcategory description 603 from the data source. The entity classification system 100 can perform a pre-process, for example, a text scrapping process of the subcategory description as shown at 605 to sanitize the subcategory description i.e., remove not meaningful words. In some instances, the text scrapping process 605 eliminates noise from the subcategory description through, for example, a list of stop-words, then groups together inflected forms of words so they can be analysed as a single item, identified by, for example, a word lemma or in dictionary form. Thereafter, the results from the text scrapping of the subcategory description can be merged at the category level as shown at 607 to create relevant prototypes for such a category level.

In some embodiments, the entity classification system 100 can process the data at the subcategory level and/or the data at the category level through a name entity recognition process to remove generic words, for example, places, currencies, brands, geolocation, parties, or other suitable generic words. In some embodiments, the entity classification system 100 can execute a Term Frequency-Inverse Document Frequency (TFIDF) process to differentiate between different categories and different subcategories. The TFIDF process can be applied to identify how important a word is to a sentence or collection of words.

In some embodiments the data processed at 605 can be used as training data to generate a trained machine learning model, for example, a deep neural network to produce subcategory prototypes representing embeddings using, for example, a Long Short-Term Memory (LSTM), a Bidirectional Long Short-Term Memory (Bi-LSTM) or other suitable type of neural network. Such a neural network can be configured to focused on capturing contextual information and/or semantic meaning of words across multiple sentences as shown at 609 and discussed with respect to categorization machine learning model 203 in FIG. 2. Such a neural network can produce multiple subcategory prototypes represented by word embeddings as shown at 613, 615, and 617. In some instances, the entity classification system 100 can use one or more of the subcategory prototypes represented by word embeddings to compute a subcategory for a given input, for example, input 601.

In some embodiments the data processed at 607 can be likewise used as training data to generate a trained machine learning model, for example, a deep neural network to produce category prototypes representing embeddings using, for example, a Long Short-Term Memory (LSTM), a Bidirectional Long Short-Term Memory (Bi-LSTM), or other suitable type of neural network. Such neural network can be configured to focused on capturing contextual information and/or semantic meaning across words in sentences as shown at 611 and as discussed with respect to categorization machine learning model 201 in FIG. 2. Such a neural network can produce multiple category prototypes represented by word embeddings as shown at 619, 621, and 623. In some instances, the entity classification system 100 can use one or more of the category prototypes represented by word embeddings to output a category for a given input, for example, input 601.

In some embodiments, input 601 can include information associated with a user, group of users, or non-person entity (e.g., a merchant). In some implementations, a category and subcategory can be determined by a cosine similarity technique based on the principle of an orientation of a row vector in a n-dimensional space and the nearest vector is used to assign a category and subcategory of the input 601. Cosine similarity is a measure of similarity between two non-zero vectors of an inner product space that measures the cosine of the angle between them. In some implementations, an input vector can be produced from input 601, using already the computed word embeddings available from category/subcategory against whom it is being matched, and the cosine similarity technique can be applied between the input vector and vectors derived from the category prototypes represented by word embeddings and/or the vectors derived from the subcategory prototypes represented by word embeddings.

Figure 7:
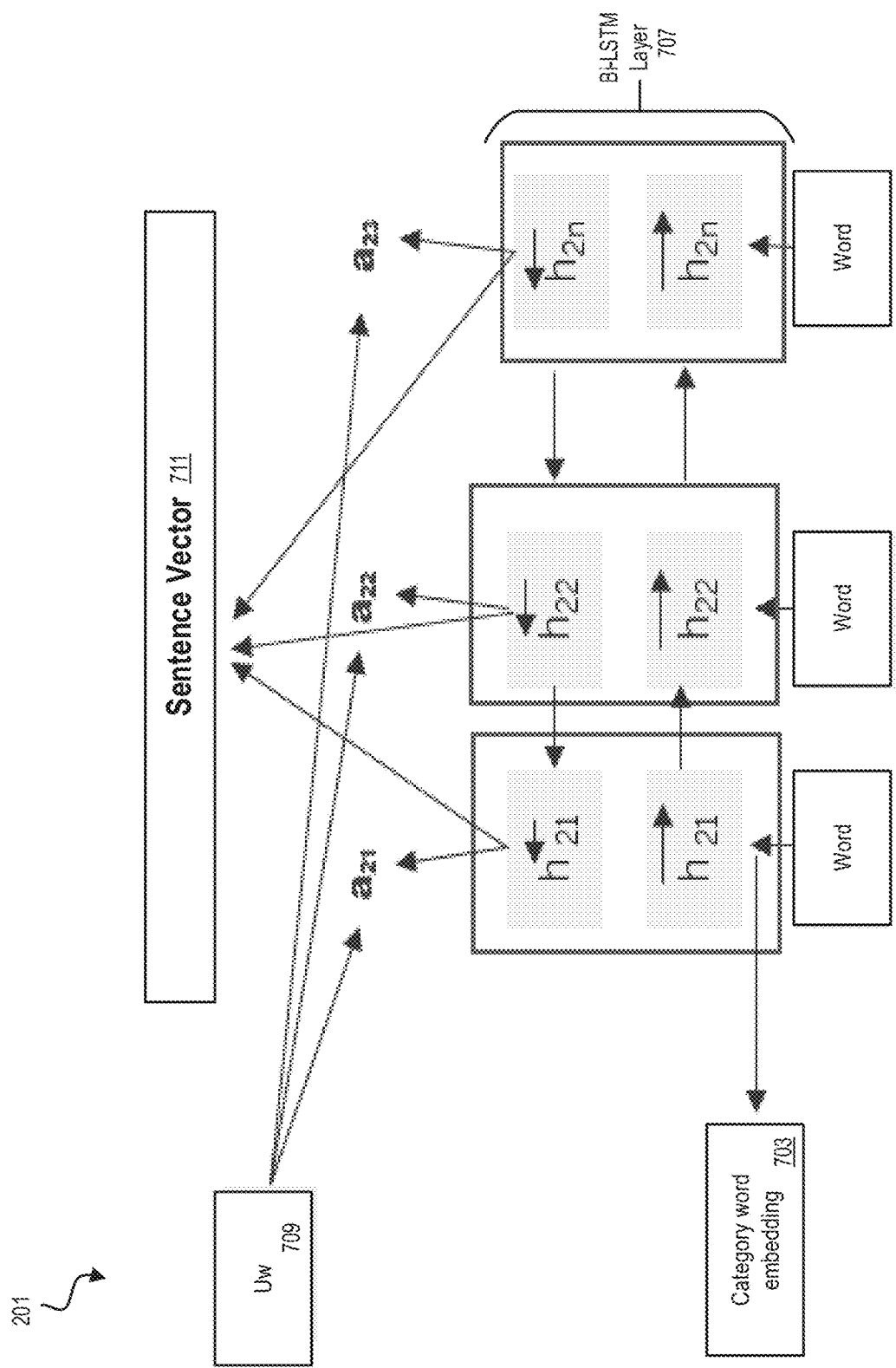

FIG. 7 illustrates an example of a categorization neural network implemented by the classification system, in accordance with one or more embodiments of the present disclosure. In some implementations, the categorization machine learning model 201 can be trained to produce word embeddings with a training set containing, for example, N number of words. The N number of words can be labelled with a category type and/or a subcategory type accordingly the N number of words can be used a ground truth for training purposes.

In some embodiments, each word in an Embedding Matrix (defined by weights) by a random vector can be representing by X dimensions or other suitable representation size. In some instances, every sentence passed to the neural network is assigned a sentence vector 711 using the word attention layer 709 on top of the hidden state outputs obtained from a bidirectional LSTM 707 both having a vector size of X. The vector obtained is then connected to the fully connected layer which calculates the probability that the input sentence belongs to a category and then through back propagation through time the Bi-LSTM cell weights can be updated, and likewise any random embeddings/vector that originally assigned to each word. After training, the embedding is obtained from the hidden state of Bi-LSTM, 707, and referred as dynamic embedding because based on the context of the sentence the output hidden state of LSTM can change for an inputted a word. In some instances, a fixed embedding for a word is obtained at 703 by computing arithmetic mean for all occurrences of the word in sentences of training data.

Figure 8:
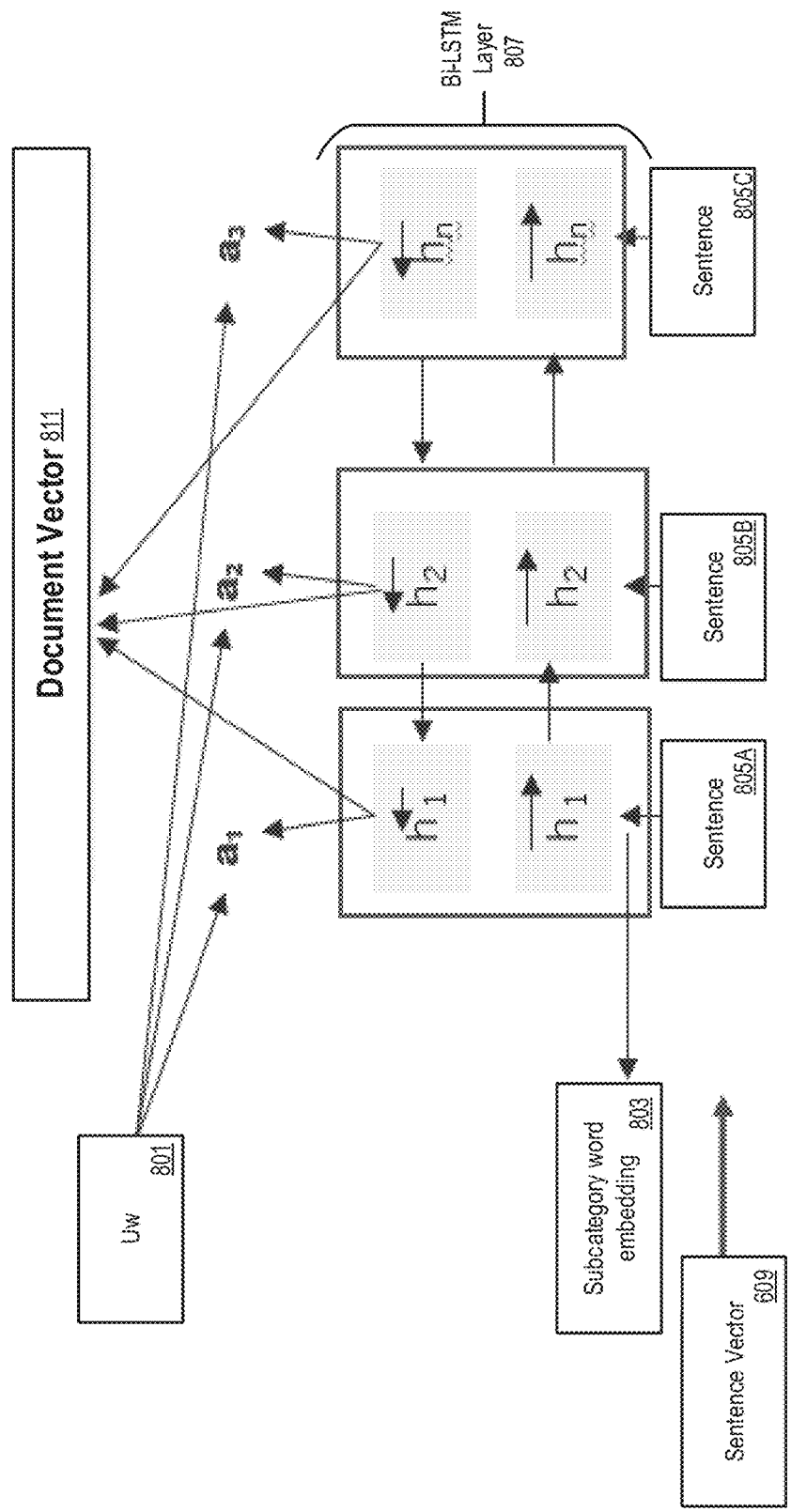

FIG. 8 illustrates an example of a subcategorization neural network implemented by the classification system, in accordance with one or more embodiments of the present disclosure. In some implementations, the subcategorization machine learning model 203 can be trained with a training set of sentences containing, for example, a maximum of N words in a sentence and a maximum of Y sentences. Such sentences can be labelled with subcategories and thus, can be used as ground truth. In some embodiments categorized sentence vectors 609 produced by the categorization machine learning model 201 can be used as a based layer including, for example, sentence 805A, 805B, and 805C. In some embodiments, after passing each sentence through this layer a sentence vector can be generated. The group of sentence vectors 805A, 805B, and 805C are representations of sequence of sentences in a document. The group of sentence vectors can be inputted to a multi stacked Bi-LSTM 807 with a deep attention network 801 to obtain the document vector 811 and again through back propagation through time the weights can be updated of each layer. It is noted that through back propagation the semantic interactions happening between words in the sentence embedding layer can be inherently captured, and the sentence embedded layer can be used every time a sentence is inputted to get a dynamic word embedding which captures semantic interactions during classification of a user, group of users, or non-person entity (e.g., a merchant) at subcategory level. Such dynamic embedding is useful for understanding of deep contextual information and/or semantic meaning when the vectors representations change with sentences. After training, the embedding is obtained from the hidden state of Bi-LSTM, 807 referred as dynamic embedding because based on the context of the sentence the output hidden state of LSTM can change for an inputted word. In some instances, a fixed embedding for a word can be obtained by computing arithmetic mean for all occurrences of the word in sentences of training data 803. While computing arithmetic mean can be further normalized by the attention score obtained from 801.

Figure 9:
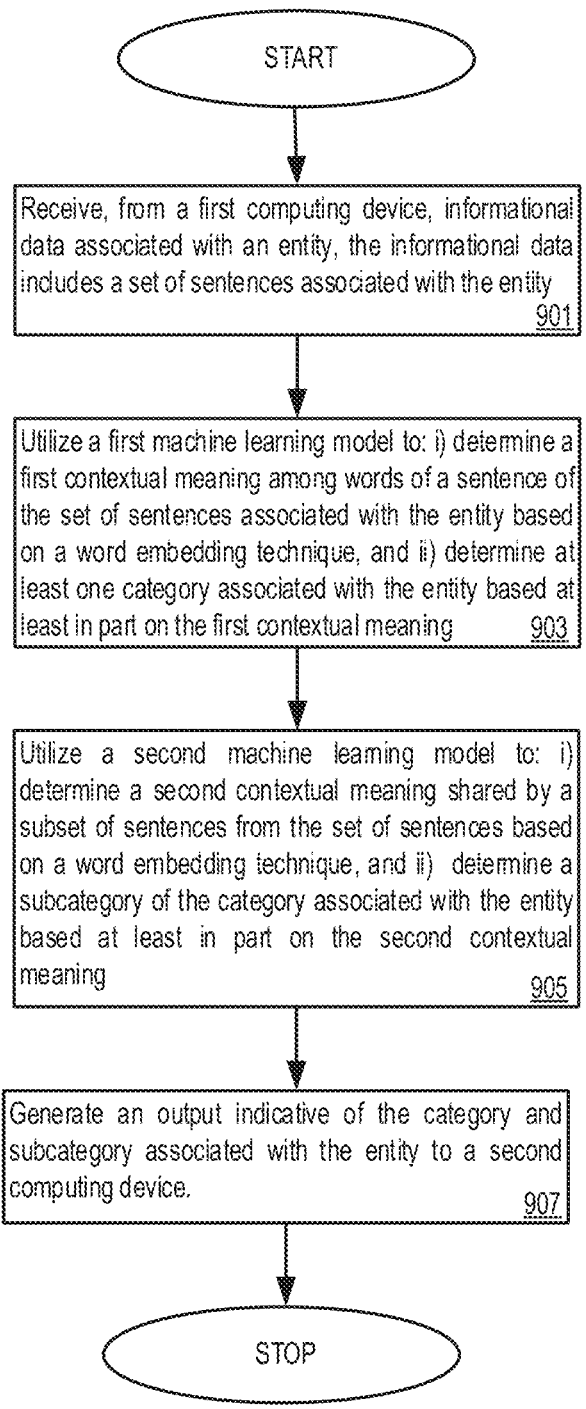

FIG. 9 is a flow chart illustrative of an example of computations executed by an entity classification system, in accordance with one or more embodiments of the present disclosure. In some embodiments, the entity classification system 100 receives or extracts for a first computing device or data source informational data associated with an entity, the informational data includes a set of sentences associated with the entity as shown at 901. Thereafter, a first machine learning model is utilized to: 1) determine a first contextual meaning among words of a sentence of the set of sentences associated with the entity based on a word embedding technique, and 2) determine at least one category associated with the entity based at least in part on the first contextual meaning as shown at 903. Thereafter, the entity classification system 100 can utilize a second machine learning model to: 1) determine a second contextual meaning shared by a subset of sentences from the set of sentences based on a word embedding technique, and 2) determine a subcategory of the category associated with the entity based at least in part on the second contextual meaning as shown at 905. Thereafter, the entity classification system 100 can generate an output indicative of the category and subcategory associated with entity to, for example, the first computing device or a second computing device as shown at 907.

It is noted that the entity classification system can achieve at least an accuracy of 98% on the classification of categories and at least an accuracy of 90% on the classification of subcategories.

Figure 10:
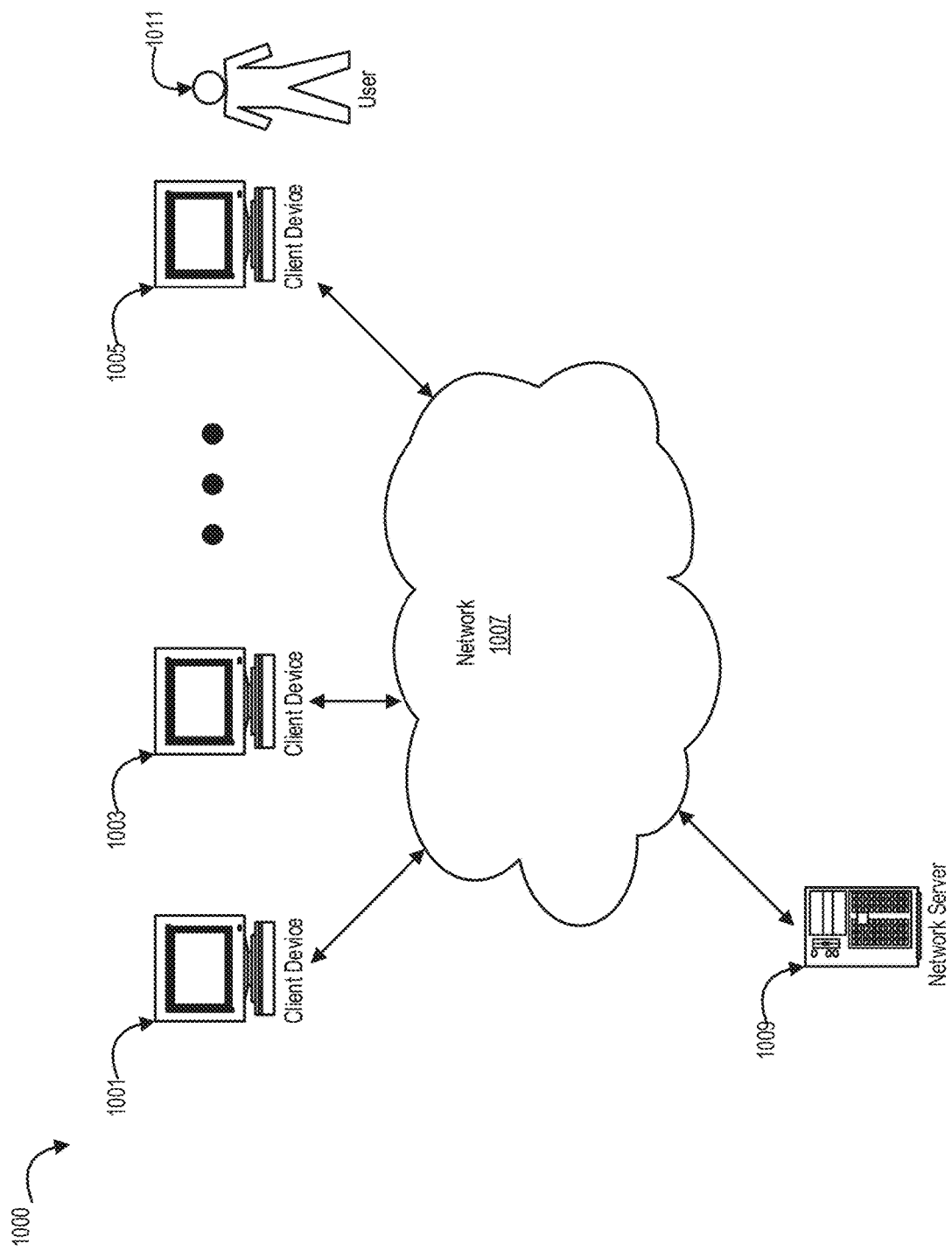

FIG. 10 depicts an example of a block diagram of a computer-based system 1000, in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the computing devices and/or the computing components of the computer-based system 1000 may be configured to manage large numbers of members and/or concurrent transactions or electronic activities, as detailed herein. In some embodiments, the computer-based system 1000 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 10, members 1001, 1003, and 1005 (e.g., clients) of the computer-based system 900 may include virtually any computing device capable of receiving and sending a message over a network (e.g., cloud network), such as network 1007, to and from another computing device, such as server 1009, and the like. In some embodiments server 1009 can implement the entity classification system 100 discussed above with reference to FIG. 1. In some embodiments server 1009 can be part of a financial institution system, merchant system, online store system, or other suitable entity. In some embodiments server 1009 can implement the database or storage device 103 discussed above with reference to FIG. 1. In some embodiments the member devices 1001, 1003, and 1005 can be used to submit (for example by user 1011) classification queries or questions to the entity classification system 100. In some embodiments, the member devices 1001, 1003, and 1005 may be personal computers, multiprocessor systems, microprocessor-based or programmable consumer electronics, network PCs, and the like. In some embodiments, one or more member devices within member devices 1001, 1003, and 1005 may include computing devices that typically connect using a wireless communications medium such as cell phones, smart phones, pagers, Radio Frequency (RF) devices, Infrared (IR) devices, Cell Broadcast (CB), integrated devices combining one or more of the preceding devices, or virtually any mobile computing device, and the like. In some embodiments, one or more member devices within member devices 1001, 1003, and 1005 may be devices that are capable of connecting using a wired or wireless communication medium such as, wearable computer, a laptop, tablet, desktop computer, a netbook, a video game device, a pager, a smart phone, and/or any other device that is equipped to communicate over a wired and/or wireless communication medium. In some embodiments, one or more member devices within member devices 1001, 1003, and 1005 may run one or more applications, such as Internet browsers, mobile applications, voice calls, video games, videoconferencing, and email, among others. In some embodiments, one or more member devices within member devices 1001, 1003, and 1005 may be configured to receive and to send web pages, and the like. In some embodiments, a browser application of the present disclosure may be configured to receive and display graphics, text, multimedia, and the like, employing virtually any web based language, including, but not limited to Standard Generalized Markup Language (SMGL), such as HyperText Markup Language (HTML), a Wireless Application Protocol (WAP), a Handheld Device Markup Language (HDML), such as Wireless Markup Language (WML), WMLScript, XML, JavaScript, and the like. In some embodiments, a member device within member devices 1001, 1003, and 1005 may be specifically programmed by either Java, .Net, QT, C, C++ and/or other suitable programming language. In some embodiments, one or more member devices within member devices 1001, 1003, and 1005 may be specifically programmed to include or execute an application to perform a variety of possible tasks, such as, without limitation, messaging functionality, browsing, searching, playing, streaming or displaying various forms of content, including locally stored or uploaded messages, images and/or video.

In some embodiments, the network 1007 may provide network access, data transport and/or other services to any computing device coupled to it. In some embodiments, the network 1007 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the network 1007 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 1007 may include and implement, as an alternative or in conjunction with one or more of the above, a WiMAX architecture defined by the WiMAX forum. In some embodiments and, optionally, in combination of any embodiment described above or below, the network 1007 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the network 1007 may be transmitted based at least in part on one of more communication modes such as but not limited to: Near-Field Communication (NFC), Radio Frequency Identification (RFID), Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof. In some embodiments, the network 1007 may also include mass storage, such as Network Attached Storage (NAS), a Storage Area Network (SAN), a Content Delivery Network (CDN) or other forms of computer or machine-readable media.

In some embodiments, the server 1009 may be a web server (or a series of servers) running a network operating system. In some embodiments, the server 1009 may be used for and/or provide cloud and/or network computing. Although not shown in FIG. 10, in some embodiments, the server 1009 may have connections to external systems like email, Short Message Service (SMS) messaging, text messaging, ad content providers, etc.

In some embodiments and, optionally, in combination of any embodiment described above or below, for example, one or more computing member devices 1001, 1003, and 1005, the server 1009, may include a specifically programmed software module that may be configured to send, process, and receive information using a scripting language, a remote procedure call, an email, a tweet, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As used herein, the term "user" shall refer to at least one user. In some embodiments, the term "user" should be understood to refer to a provider of an application or applications as described herein and/or a consumer of data supplied by a data provider. By way of example, and not limitation, the terms "user" or "developer" can refer to a person who receives data provided by the data or service provider over the Internet in a browser session, or can refer to an automated software application which receives the data and stores or processes the data.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" or "near real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process. In some embodiments, events and/or actions in accordance with the present disclosure can be in real-time, near real-time, and/or based on a predetermined periodicity of at least one of: nanosecond, several nanoseconds, millisecond, several milliseconds, second, several seconds, minute, several minutes, hourly, several hours, daily, several days, weekly, monthly, etc. As used herein, the term "dynamically" and term "automatically," and their logical and/or linguistic relatives and/or derivatives, mean that certain events and/or actions can be triggered and/or occur without any human intervention.

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices, and others. In some embodiments, the non-transitory machine-readable medium can include one or more storage devices, and memory devices described above.

As used herein, the terms "computer engine" and "engine" identify at least one software component and/or a combination of at least one software component and at least one hardware component designed/programmed/configured to interact with other software and/or hardware components and/or compute system outputs.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or Central Processing Unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers can be, for example, a collection of servers serving one or more functions of a single server.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms.

In some embodiments, computer-based systems of the present disclosure may be configured to utilize hardwired circuitry and/or hardware components that may be used in place of or in combination with software instructions to implement features consistent with principles of the disclosure. Thus, implementations consistent with principles of the disclosure are not limited to any specific combination of hardware circuitry or hardware components and/or software In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100(e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

As used herein, term "cloud" and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by a hardware of one type running (Operating System) OS of one type may emulate hardware of a different type and/or an OS of a different type, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

At least some aspects of the present disclosure will now be described with reference to the following numbered clauses.

Clause 1: An apparatus, comprising:
a processor;
and a non-transitory memory storing instructions which, when executed by the processor, causes the processor to:
receive, from a first computing device, informational data associated with an entity;
wherein the informational data comprises a plurality of sentences associated with the entity;
utilize a first machine learning model to:
determine a first contextual meaning among words of a sentence of the plurality of sentences associated with the entity based on a first word embedding technique, and
utilize a second machine learning model to:
determine a second contextual meaning shared by a subset of sentences from the plurality of sentences based on a second embedding technique, and
send an output indicative of a_category and a_subcategory associated with the entity to a second computing device wherein, the category is based at least in part on the first contextual meaning and the subcategory is based at least in part on the second contextual meaning.

Clause 2: The apparatus of clause 1, wherein the first machine learning module produces a plurality of category profiles represented by word embeddings, and the category associated with the entity is determined at least in part on a category profile represented by word embeddings from the plurality of category profiles represented by word embeddings.

Clause 3: The apparatus of any of the clauses 1 to 2, wherein the second machine learning module produces a plurality of subcategory profiles represented by word embeddings, and the subcategory associated with the entity is determined at least in part on a subcategory profile represented by word embeddings from the plurality of subcategory profiles represented by word embeddings.

Clause 4: The apparatus of any of the clauses 1 to 3, wherein each of the first machine learning model and the second machine learning model are implemented as neural networks and produce dynamic embedding of words based on a sentence context.

Clause 5: The apparatus of any of the clauses 1 to 4, wherein the category associated with the entity and the subcategory associated with entity are determined at least in part utilizing a cosine similarity technique between the information data associated with the entity and,
i) the plurality of category profiles represented by word embeddings;
ii) the plurality of subcategory profiles represented by word embeddings; and iii) the entity converted to a vector by replacing the entity words by word embeddings created by a matched category and subcategory.

Clause 6: The apparatus of any of the clauses 1 to 5, wherein the first machine learning model or the second machine learning model utilize at least one dynamic word embedding technique.

Clause 7: The apparatus of any of the clauses 1 to 6, wherein each of the first machine learning model and the second machine learning model are trained based on a supervised machine learning training technique.

Clause 8: The apparatus of any of the clauses 1 to 7, wherein the second machine learning model produces the subcategory at least in part based on the category associated with the entity computed by the first machine learning model.

Clause 9: The apparatus of any of the clauses 1 to 8, wherein each of the category and the subcategory associated with the entity are associated with a standard industrial classification code.

Clause 10: The apparatus of any of the clauses 1 to 9, wherein the first computing device implements a search engine and the information associated with the entity is received by the processor from the search engine implemented in the first computing device.

Clause 11: A method, comprising:
receiving, by a processor, from a first computing device, informational data associated with an entity;
wherein the informational data comprises a plurality of sentences associated with the entity;
utilizing, by the processor, a first machine learning model to:
determine a first contextual meaning among words of a sentence of the plurality of sentences associated with the entity based on a first word embedding technique, and
utilizing, by the processor, a second machine learning model to:
determine a second contextual meaning shared by a subset of sentences from the plurality of sentences based on a second embedding technique, and
sending, by the processor, an output indicative of a_category and a_subcategory associated with the entity to a second computing device wherein, the category is based at least in part on the first contextual meaning and the subcategory is based at least in part on the second contextual meaning.

Clause 12: The method of clause 11, wherein the first machine learning module produces a plurality of category profiles represented by word embeddings, and the category associated with the entity is determined at least in part on a category profile represented by word embeddings from the plurality of category profiles represented by word embeddings.

Clause 13: The method of any of the clauses 11 to 12, wherein the second machine learning module produces a plurality of subcategory profiles represented by word embeddings, and the subcategory associated with the entity is determined at least in part on a subcategory profile represented by word embeddings from the plurality of subcategory profiles represented by word embeddings.

Clause 14: The method of any of the clauses 11 to 13, wherein each of the first machine learning model and the second machine learning model are implemented as neural networks.

Clause 15: The method of any of the clauses 11 to 14, wherein the category associated with the entity and the subcategory associated with entity are determined at least in part utilizing a cosine similarity technique between the information data associated with the entity and,
i) the plurality of category profiles represented by word embeddings;
ii) the plurality of subcategory profiles represented by word embeddings; and
iii) the entity converted to a vector by replacing its words by a word embeddings generated by a matched category and sub-category.

Clause 16: The method of any of the clause 11 to 15, wherein the first machine learning model or the second machine learning model utilize at least one dynamic word embedding technique.

Clause 17: The method of any of the clauses 11 to 16, wherein each of the first machine learning model and the second machine learning model are trained based on a supervised machine learning training technique.

Clause 18: The method of any of the clauses 11 to 17, wherein the second machine learning model produces the subcategory at least in part based on the category associated with the entity computed by the first machine learning model.

Clause 19: The method of any of the clauses 11 to 18, wherein each of the category and the subcategory associated with the entity are associated with a standard industrial classification code.

Clause 20: A non-transitory computer readable medium comprising code which, when executed by a processor, causes the processor to:
receive, from a first computing device, informational data associated with an entity;
wherein the informational data comprises a plurality of sentences associated with the entity;
utilize a first machine learning model to:
determine a first contextual meaning among words of a sentence of the plurality of sentences associated with the entity based on a first word embedding technique, and
utilize a second machine learning model to:
determine a second contextual meaning shared by a subset of sentences from the plurality of sentences based on a second embedding technique, and
send an output indicative of a_category and a_subcategory associated with the entity to a second computing device wherein, the category is based at least in part on the first contextual meaning and the subcategory is based at least in part on the second contextual meaning.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

The invention claimed is:
1. An apparatus, comprising:
a processor; and
a non-transitory memory storing instructions which, when executed by the processor, causes the processor to:

receive, from a first computing device, informational data associated with an entity, wherein the informational data comprises a plurality of sentences associated with the entity;
utilize a first machine learning model to:
  determine a first contextual meaning among words of a sentence of the plurality of sentences associated with the entity based on a first word embedding technique; and
utilize a second machine learning model to:
  determine a second contextual meaning shared by a subset of sentences from the plurality of sentences based on a second word embedding technique;
determine a category and a subcategory associated with the entity by:
  generating an input vector based at least in part on the first contextual meaning and the second contextual meaning;
  generating a plurality of vectors derived from a plurality of category profiles and a plurality of subcategory profiles represented by word embeddings, wherein the plurality of vectors is further derived by replacing entity words in the plurality of sentences with the word embeddings; and
  applying a cosine similarity technique to compare the input vector to the plurality of vectors to determine the category and the subcategory; and
send an output indicative of the category and the subcategory associated with the entity to a second computing device.

2. The apparatus of claim 1, wherein the first machine learning model produces the plurality of category profiles represented by word embeddings, and the category associated with the entity is determined at least in part on a category profile represented by word embeddings from the plurality of category profiles represented by word embeddings.

3. The apparatus of claim 1, wherein the second machine learning model produces the plurality of subcategory profiles represented by word embeddings, and the subcategory associated with the entity is determined at least in part on a subcategory profile represented by word embeddings from the plurality of subcategory profiles represented by word embeddings.

4. The apparatus of claim 1, wherein each of the first machine learning model and the second machine learning model are implemented as neural networks and produces dynamic embedding of words based on a sentence context.

5. The apparatus of claim 1, wherein the first machine learning model or the second machine learning model utilizes at least one dynamic word embedding technique.

6. The apparatus of claim 1, wherein each of the first machine learning model and the second machine learning model are trained based on a supervised machine learning training technique.

7. The apparatus of claim 1, wherein the second machine learning model produces the subcategory at least in part based on the category associated with the entity computed by the first machine learning model.

8. The apparatus of claim 1, wherein each of the category and the subcategory associated with the entity are associated with a standard industrial classification code.

9. The apparatus of claim 1, wherein the first computing device implements a search engine and the informational data associated with the entity is received by the processor from the search engine implemented in the first computing device.

10. A method, comprising:
receiving, by a processor, from a first computing device, informational data associated with an entity, wherein the informational data comprises a plurality of sentences associated with the entity;
utilizing, by the processor, a first machine learning model to:
  determine a first contextual meaning among words of a sentence of the plurality of sentences associated with the entity based on a first word embedding technique; and
utilizing, by the processor, a second machine learning model to:
  determine a second contextual meaning shared by a subset of sentences from the plurality of sentences based on a second word embedding technique;
determining a category and a subcategory associated with the entity by:
  generating an input vector based at least in part on the first contextual meaning and the second contextual meaning;
  generating a plurality of vectors derived from a plurality of category profiles and a plurality of subcategory profiles represented by word embeddings, wherein the plurality of vectors is further derived by replacing entity words in the plurality of sentences with the word embeddings; and
  applying a cosine similarity technique to compare the input vector to the plurality of vectors to determine the category and the subcategory; and
sending, by the processor, an output indicative of the category and the subcategory associated with the entity to a second computing device.

11. The method of claim 10, wherein the first machine learning model produces the plurality of category profiles represented by word embeddings, and the category associated with the entity is determined at least in part on a category profile represented by word embeddings from the plurality of category profiles represented by word embeddings.

12. The method of claim 10, wherein the second machine learning model produces the plurality of subcategory profiles represented by word embeddings, and the subcategory associated with the entity is determined at least in part on a subcategory profile represented by word embeddings from the plurality of subcategory profiles represented by word embeddings.

13. The method of claim 10, wherein each of the first machine learning model and the second machine learning model are implemented as neural networks.

14. The method of claim 10, wherein the first machine learning model or the second machine learning model utilizes at least one dynamic word embedding technique.

15. The method of claim 10, wherein each of the first machine learning model and the second machine learning model are trained based on a supervised machine learning training technique.

16. The method of claim 10, wherein the second machine learning model produces the subcategory at least in part based on the category associated with the entity computed by the first machine learning model.

17. The method of claim 10, wherein each of the category and the subcategory associated with the entity are associated with a standard industrial classification code.

18. A non-transitory computer readable medium comprising code which, when executed by a processor, causes the processor to:

receive, from a first computing device, informational data associated with an entity, wherein the informational data comprises a plurality of sentences associated with the entity;

utilize a first machine learning model to:
   determine a first contextual meaning among words of a sentence of the plurality of sentences associated with the entity based on a first word embedding technique; and utilize a second machine learning model to:
   determine a second contextual meaning shared by a subset of sentences from the plurality of sentences based on a second word embedding technique;

determine a category and a subcategory associated with the entity by:
   generating an input vector based at least in part on the first contextual meaning and the second contextual meaning;
   generating a plurality of vectors derived from a plurality of category profiles and a plurality of subcategory profiles represented by word embeddings, wherein the plurality of vectors is further derived by replacing entity words in the plurality of sentences with the word embeddings; and
   applying a cosine similarity technique to compare the input vector to the plurality of vectors to determine the category and the subcategory; and send an output indicative of the category and the subcategory associated with the entity to a second computing device.

* * * * *